May 20, 1924.  
G. BAILHE  
ACCELERATOR FOR MOTOR VEHICLES  
Filed May 2, 1923  
1,495,062
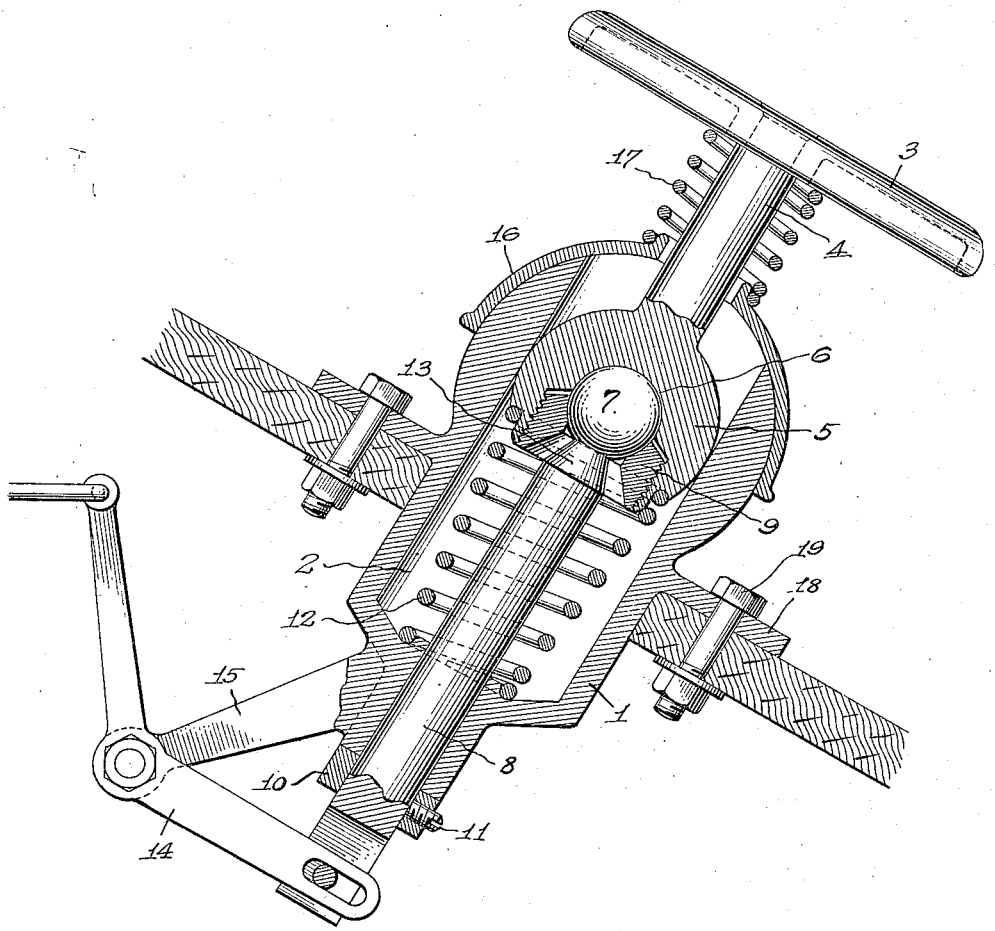
Inventor  
George Bailhe,  
By Homer C Underwood  
Attorney Patented May 20, 1924.

1,495,062

UNITED STATES PATENT OFFICE.

GEORGE BAILHE, OF FORT WAYNE, INDIANA.

ACCELERATOR FOR MOTOR VEHICLES.

Application filed May 2, 1923. Serial No. 636,053.

*To all whom it may concern:*

Be it known that I, GEORGE BAILHE, a citizen of the United States of America, residing in the city of Fort Wayne, county of Allen, and State of Indiana, have invented certain new and useful Improvements in Accelerators for Motor Vehicles, of which the following is a specification.

My invention relates to accelerators for motor vehicles and has for its object to provide an accelerator by which the driver of a motor vehicle may accelerate the speed of his car to a degree desired and by tilting the foot-pedal out of its central or normal position may lock the same in such position so long as he desires to hold his car at that speed, and when it is desired to change the speed, he may do so by again tilting the foot-pedal toward or to its central position and it may then be given greater or less speed by downward pressure on the foot-pedal. While held in a locked position it also provides a rest for the foot without change of speed.

With the foregoing and other objects in view I will now describe the mechanism by which these objects are attained, referring to the drawing forming a part of my specification, and using reference numerals to indicate the several parts.

Fig. 1 is a vertical section showing my accelerator secured to the floor-board of a motor vehicle.

The connection to the carburetor, and the carburetor itself, are not shown because those may be of any linkage in common use and the carburetor of any of the usual types, both of which are well understood by those skilled in the art.

In the accompanying drawings, 1 is a casing, spherical in form at its upper end, and 2 is a cylindrical bore therein. 3 is a foot-pedal having a stem portion 4, and its lower end terminating in a ball 5 which is provided with a spherical recess, 6, concentric with the surface of the ball 5, said recess being adapted to receive the spherical head 7 of the plunger 8. A screw-bushing 9 retains the head of the plunger in the ball, 5, of the foot-pedal. The plunger 8 is adapted to reciprocate in its bearing in the lower end of the casing 1. A collar 10 encircles the lower end of the plunger and is adapted to abut against the bottom of the casing 1, and is secured to the plunger by a screw, 11. The function of this collar is to limit the upward travel of the plunger. Within the bore 2 of the casing is a spring 12, which may be secured to the bottom of said casing in any suitable manner, and is likewise secured to the ball 5. The function of the spring 12 is to form a resilient resisting member in producing acceleration and to return the accelerator to its normal position when pressure is removed from the foot-pedal. 13 is a constricted portion of the plunger, conically shaped, with which the screw-bushing 9 is adapted to engage when the foot-pedal is tilted in any direction causing the ball 5 to revolve on the spherical head of the plunger until the screw-bushing comes in contact with the constricted portion of the plunger, thereby locking the plunger in whatever position it may be at the time of such tilting action. The locking is occasioned by frictional resistance at points on the lower end of the plunger where it passes through its bearing at the lower end of the casing 1. The lower end of the plunger may be connected to linkage running to the carburetor, by means of a bell-crank 14, mounted on the bracket 15. 16 is a dust-cap to cover the bore 2, and is loosely held against the spherical upper end of the casing 1 by a spring 17, interposed between said cap and the portion 3 of the foot-pedal which is adapted to receive the foot of the driver. The casing 1 is provided with flanges 18 by which the casing may be secured to the floor-board of the vehicle by bolts 19.

The operation of my device will be apparent from the drawing and the description above set forth. When the driver wishes to accelerate his car he presses downward on the foot-pedal 3 depressing the plunger 8 which in turn actuates the bell-crank 14 which opens the throttle. The desired speed having been attained, he then tilts the foot-pedal out of its normal position until the screw-bushing comes in contact with the constricted portion of the plunger and further pressing the same produces a frictional resistance at points on the lower end of the plunger, and thus prevents further movements of the plunger in either direction until the pressure is released, when the spring 12 will return the foot-pedal to normal or central position, or manifestly, the same may be returned to normal position by the driver turning the foot-pedal to central position with his foot.

Having fully described my invention and its mode of operation, what I claim is:

1. In an accelerator for motor vehicles, a member connected to linkage leading to the throttle of the carburetor of the vehicle, a casing having a bearing in which said member is adapted to be reciprocated, and a foot-pedal adapted to engage said member so as to produce a frictional resistance between said bearing and said member to prevent further movement of said member.

2. In an accelerator for motor vehicles, a member having a spherical head and a constricted portion below the head, a foot-pedal mounted on said member and adapted to engage the constricted portion of said member when the foot-pedal is tilted from its normal position.

3. In an accelerator for motor vehicles, a casing having a spherical upper end, a bore in the casing, a foot-pedal adapted to be reciprocated in said bore, a cap loosely mounted on the casing and movable in relation to the casing.

4. In an accelerator for motor vehicles, a member having a spherical head and a constricted portion below the head, a foot-pedal mounted on said member and adapted to engage the constricted portion thereof when the foot-pedal is tilted from its normal position, a casing in which said member is adapted to be reciprocated, and a resilient member supported by the casing and connected to the lower end of the foot-pedal.

5. An accelerator for motor vehicles having the characteristics of claim 2 hereof, and means for limiting the upward travel of said member.

6. An accelerator for motor vehicles comprising a casing, a bore in the upper end of the casing, a cap movable in relation to the casing, a bearing in the lower end of the casing, a member adapted to be reciprocated through its bearing in the lower end of the casing, a foot-pedal in engagement with said reciprocable member normally mounted in central position in said bore and reciprocable therein and adapted to be tilted from said central position.

Signed at Fort Wayne, county of Allen, State of Indiana, this 30th day of March, 1923, in the presence of two subscribing witnesses.

GEORGE BAILHE.

Witnesses:
EDITH C. LABBE,
GERTRUDE SCHOLL.